United States Patent [19]
Michaud

[11] Patent Number: 5,994,432
[45] Date of Patent: Nov. 30, 1999

[54] STORAGE-STABLE/CLEAR SOLUTIONS OF POLY(IMIDEAMIDES)

[75] Inventor: Philippe Michaud, Lyons, France

[73] Assignee: Ciba Specialty Chemicals Corporation, Tarrytown, N.Y.

[21] Appl. No.: 07/727,539

[22] Filed: Jul. 9, 1991

[30] Foreign Application Priority Data

Jul. 9, 1990 [FR] France .................................. 90 08914

[51] Int. Cl.⁶ ...................................................... C08K 5/15
[52] U.S. Cl. .................................. 524/111; 528/51; 528/52
[58] Field of Search .............................. 524/111; 528/51, 528/52

[56] References Cited

U.S. PATENT DOCUMENTS

| 4,950,700 | 8/1990 | Balme et al. | 524/111 |
| 4,954,577 | 9/1990 | Dunwald et al. | 528/51 |
| 5,118,778 | 6/1992 | Lambla et al. | 528/52 |

FOREIGN PATENT DOCUMENTS 58-154728  9/1983  Japan .

*Primary Examiner*—Edward J. Cain
*Attorney, Agent, or Firm*—David R. Crichton

[57] ABSTRACT

Storage-stable/clear solutions of linear aromatic poly(imideamides), well adopted for forming high luminance films and varnishes, comprise (a) an anhydrous γ-butyrolactone solvent phase, such γ-butyrolactone solvent phase (a) having from 5% to 40% by weight of a linear aromatic poly(imideamide) (b) dissolved therein, such linear aromatic poly(imideamide) (b) comprising the copolymerizate of (i) 2,4-diisocyanatotoluene, 2,6-diisocyanatotoluene, or mixture thereof, with (ii) a tricarboxylic acid monoanhydride, e.g., trimellitic acid monoanhydride, optionally, (iii) an aromatic dicarboxylic acid, e.g., terephthalic or isophthalic acid, and (iv) a monocarboxylic acid or dicarboxylic acid monoanhydride chain limiting agent, e.g., benzoic acid or phthalic anhydride.

10 Claims, No Drawings

STORAGE-STABLE/CLEAR SOLUTIONS OF POLY(IMIDEAMIDES)

BACKGROUND OF THE INVENTION

1. Field of the Invention

The present invention relates to novel solutions of linear aromatic poly(imideamides) which are both clear at room temperature (23° C.) and stable in storage at the same temperature, and to the production of films and varnishes therefrom which have a color, as determined by the luminance value (as defined below) of a sample thereof which has a thickness of 10 to 100 μm and is deposited onto a stainless steel substrate, ranging from 10 to 50.

The present invention also relates to a process for preparing poly(imideamide) solutions exhibiting the properties indicated above.

In the international XYZ trichromatic system defined by the International Commission on Illumination in 1931, the Y component, or luminance value, indicates the physiological impression of luminosity (ranging from dark to light) of a sample. A luminance value of zero corresponds to the color black and a value of 100 corresponds to the color perfect white. In practice, the luminance value is determined by measuring the scattered reflection of the sample which has a thickness of 10 to 100 μm and is deposited on a stainless steel substrate, in the green region of the spectrum (wavelength centered at 550 nm) with the aid of a filter colorimeter of the Elrepho Zeiss trademark.

2. Description of the Prior Art

FR-A-2,079,785 describes solutions based on poly(imideamide) in N-methylpyrrolidone, but such solutions have an intense brown color which remains in the articles produced from these solutions and which consequently limits the use of such articles.

FR-A-2,627,497 relates to reducing such objectionable discoloration by (a) conducting the polycondensation reaction producing the poly(imideamide) in a solvent consisting of anhydrous γ-butyrolactone (γ-BL), free from butyl alcohol and employed in an amount such that the polymer concentration upon completion of the polycondensation reaction (expressed as the percentage by weight of polymer in the total of polymer+solvent) ranges from 12% to 39%, and then (b), at the end of said polycondensation reaction, carrying out a hot dilution of the reaction solution at a temperature ranging from 120° C. to 165° C. with an anhydrous aprotic polar solvent such as N-methylpyrrolidone, dimethylacetamide, dimethylformamide or tetramethyl urea, said diluting solvent being employed in an amount such that, on the one hand, the final concentration of the poly(imideamide) in the total amount of polymer+polycondensation solvent+diluting solvent ranges from 5% to 30% by weight and, on the other, the weight ratio of polycondensation solvent/diluting solvent ranges from 40/60 to 80/20. From said FR-A-2,627,497, and in particular Example 5 thereof, it appears essential to conduct the polycondensation reaction in γ-butyrolactone for the desired decrease in discoloration to be attained.

Thus, the process described in the abovementioned FR-A-2,627,497 presents the disadvantage of requiring a second hot dilution stage using, moreover, a second solvent which cannot advantageously be the same as that used in the polycondensation, to produce poly(imideamide) solutions which do not precipitate and which remain clear or stable when they are stored at room temperature (23° C.) (cf. Example 18). Such additional second stage appreciably increases the cost of manufacture of the desired solution.

SUMMARY OF THE INVENTION

Accordingly, a major object of the present invention is the provision of novel poly(imideamide) solutions, by a polycondensation reaction in γ-butyrolactone, which do not precipitate at room temperature (23° C.), which remain clear and stable during storage at the same temperature, and which do not require an additional dilution stage for the preparation thereof.

Briefly, the present invention features novel poly(imideamide) solutions prepared from particular aromatic diisocyanates, an aromatic acid anhydride and, optionally, an aromatic diacid, which poly(imideamides) have a number-average molecular weight ($\overline{M}n$) which is perfectly controlled by the use of a chain limiting agent in well-determined proportions during the polycondensation.

DETAILED DESCRIPTION OF THE PREFERRED EMBODIMENTS OF THE INVENTION

More particularly according to the present invention, the subject solutions of linear aromatic poly(imideamide) which are both clear and stable in storage at room temperature (23° C.) and are capable of producing unique films or varnishes which have a color, determined by the luminance value of a sample having a thickness of 10 to 100 μm and deposited onto a stainless steel substrate, of from 10 to 50, comprise:

(a) γ-butyrolactone as the solvent, in the anhydrous state and devoid of butyl alcohol, and (b) a poly(imideamide) whose concentration (expressed as weight of polymer relative to the total weight of polymer+solvent) ranges from 5% to 40%, and which corresponds essentially to the following formula (I):

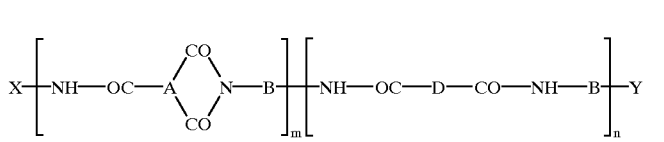

(I)

in which each of the symbols A, which are identical, is a trivalent aromatic radical having from 6 to 14 carbon atoms, whether substituted or unsubstituted, or two of these radicals linked together by a single valence bond or by a group:

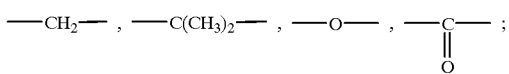

each of the symbols B, which may be identical or different, is a divalent radical selected from the radicals of the formulae:

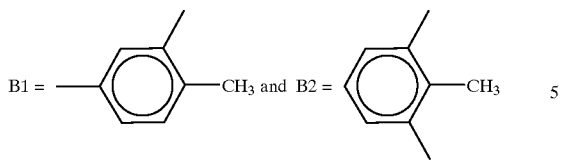

with the proviso that, in the same polymer of formula (I):

It may contain a mixture of radicals B1 and B2, or

Up to 30% of the total number of the radicals B1 and/or B2 may be replaced by radicals:

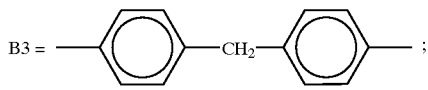

each of the symbols D, which are identical, is a divalent aromatic radical having from 6 to 14 carbon atoms, whether substituted or unsubstituted; the symbols X and Y are either the alternative X1Y1 in which X1 is E—OC—NH—B— and Y1 is —NH—CO—E, wherein E is a monovalent aromatic radical having from 6 to 14 carbon atoms, or the alternative X2Y2 in which

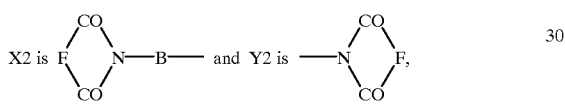

wherein F is a divalent aromatic radical having from 6 to 14 carbon atoms; the symbols m (which is a positive number) and n (which is a number equal to zero or a positive number) represent the average numbers of the various recurring structural units which are arranged statistically; with the proviso that the sum m+n ranges from 10 to 100, and the ratio r1=(n×100)/m ranges from 0 to 20.

This invention also features a process for producing the poly(imideamide) solutions described above. The solutions according to the present invention are prepared by heating the following reactants (i) to (iv), said reactants being reacted simultaneously, and the reaction being carried out at a temperature ranging from 160° to 200° C. in the presence of anhydrous and butyl alcohol-free γ-butyrolactone as solvent:

(i) at least one diisocyanate of the formula (II):

in which B is either B1 or B2 defined above in connection with the formula (I), with the proviso that B may be a mixture of a diisocyanate of formula (II) where B=B1 with a diisocyanate of formula (II) where B=B2, or a mixture of a diisocyanate of formula (II) where B=B1 and/or of a diisocyanate of formula (II) where B=B2 with not more than 30 mol % (relative to the total mixture) of a diisocyanate of formula (II) where B is B3 defined above in connection with the formula (I);

(ii) a tricarboxylic acid monoanhydride of the formula (III):

in which A is as defined above in connection with the formula (I);

(iii) optionally, a dicarboxylic acid of the formula (IV):

in which D is as defined above in connection with the formula (I); and (iv) a chain limiting agent comprising, in the event of the above alternative X1Y1, a monocarboxylic acid of the formula (V):

E—COOH  (V)

in which E is as defined above in connection with the formula (I), or, in the event of the above alternative X2Y2, a dicarboxylic acid monoanhydride of the formula (VI):

in which F is as defined above in connection with the formula (I); and further wherein the corresponding proportions of the reactants (i) to (iv) are selected such that the ratio:

$$r2 = \frac{\text{no. of moles of diisocyanate(s) (i)} \times 2}{\text{no. of moles of anhydride (ii)} \times 2 + \text{opt. no. of moles of diacid (iii)} \times 2 + \text{no. of moles of chain limiting agent (iv)}}$$

(with no.=number and opt.=optionally) is equal to 1, the ratio:

$$r3 = \frac{\text{no. of moles of chain limiting agent (iv)} \times 100}{\text{no. of moles of anhydride (ii)} + \text{opt. no. of moles of diacid (iii)}}$$

ranges from 2 to 20, and the ratio:

$$r4 = \frac{\text{no. moles of diacid (iii)} \times 100}{\text{no. of moles of anhydride (ii)}}$$

ranges from 0 to 20; and the poly(imideamide) concentration upon completion of the polycondensation (expressed as weight of polymer relative to the total weight of polymer+solvent) ranges from 5% to 40%.

The diisocyanate reactant (i) comprises 2,4-diisocyanatotoluene, 2,6-diisocyanatotoluene, a mixture of varying proportions of the abovementioned two tolylene diisocyanates, a mixture of either or both of the abovementioned two tolylene diisocyanates with not more than 30 mol % (relative to the total mixture) of 4,4'-diisocyanatodiphenylmethane. 2,4-Diisocyanatotoluene is the preferred reactant (i) according to the present invention.

Exemplary of the tricarboxylic acid monoanhydrides (ii) of formula (III), particularly representative are:

Trimellitic acid monoanhydride,
2,3,6-Naphthalenetricarboxylic acid 2,3-monoanhydride,
1,8,4-Naphthalenetricarboxylic acid 1,8-monoanhydride,
1,2,5-Naphthalenetricarboxylic acid 1,2-monoanhydride,
3,4,4'-Diphenyltricarboxylic acid 3,4-monoanhydride,
3,4,3'-Diphenyl sulfone tricarboxylic acid 3,4-monoanhydride,
3,4,4'-Diphenyl ether tricarboxylic acid 3,4-monoanhydride,
3,4,4'-Benzophenonetricarboxylic acid 3,4-monoanhydride, and
3,4,3'-Diphenylisopropylidenetricarboxylic acid 3,4-monoanhydride.

Trimellitic acid monoanhydride is the preferred reactant (ii) according to the present invention.

Exemplary of the optional aromatic diacids (iii) of formula (IV), particularly preferred are terephthalic and isophthalic acids. Terephthalic acid is the more preferred.

And exemplary of the chain limiting agents (iv), particularly preferred are:
(a) in the event of the alternative X1Y1, aromatic monoacids such as benzoic, 2-methylbenzoic, 3-methylbenzoic and 4-methylbenzoic acids, or
(b) in the event of the alternative X2Y2, aromatic acid monoanhydrides such as phthalic, 3-methylphthalic and 4-methylphthalic anhydrides.

Benzoic acid is the preferred chain limiting agent (iv) according to the present invention.

The polycondensation reaction is advantageously carried out at a temperature ranging from 160° to 200° C.; best results are attained at temperatures ranging from 170° to 190° C.

To well carry out the process of the invention, the starting reactants, which are introduced together, are dissolved in γ-butyrolactone, this operation preferably being conducted at room temperature (20° to 30° C.). The temperature of the resulting solution is then increased to the desired reaction temperature ranging from 140° to 200° C. and, preferably, from 170° to 190° C., either directly or progressively, this operation being carried out at atmospheric pressure for a period of time which will vary to a large extent as a function of the temperature conditions selected. For example, when the process is carried out at a temperature on the order of 180° C., all of the functional groups of the diisocyanate reactant (i) have reacted after 3 to 4 hours.

Upon completion of the polycondensation reaction, the polymer concentration ranges from 5% to 40%. The amount of γ-butyrolactone which is used initially is selected such that this concentration ranges from 10% to 30%.

The solutions according to the invention can be prepared noncontinuously or continuously by means of any suitable apparatus. These solutions are especially well adopted for the production of coating films, insulating varnishes, adhesive substances, this being either when the solvent evaporates, or subsequently.

When the diisocyanate reactant featured in FR-A-2,627, 497, i.e., 4,4'-diisocyanatodiphenylmethane, is used instead of the particular diisocyanate reactant (i) in accordance with the present invention, it is seen that the corresponding poly(imideamide) precipitates at room temperature, with the result that the "solution" obtained can be neither stored nor actually employed.

This precipitation phenomenon is observed both in the absence as well as in the presence of a chain limiting agent in the polycondensation mixture. A clear solution can be obtained, provided that, as per FR-A-2,627,497, an additional stage of hot dilution of the polycondensation mixture with an aprotic polar solvent, such as N-methylpyrrolidone, is carried out.

When compared with the prior art described above, the solutions according to the present invention present two advantages: first, they are prepared more simply without the necessity for an additional hot dilution stage; secondly, they produce articles of diminished coloration. For example, when used to produce films having a thickness of 50 μm, deposited onto a stainless steel panel, a luminance value ranging from 10 to 20 is attained; according to the prior art this value ranges from 2 and 5.

In order to further illustrate the present invention and the advantages thereof, the following specific examples are given, it being understood that same are intended only as illustrative and in nowise limitative.

EXAMPLE 1

The following reactants were introduced successively at room temperature (23° C.) into a 500-cm$^3$ glass reactor fitted with a central stirrer of the anchor type and with a reflux condenser, and in which a slight overpressure was established using dry nitrogen:

(a) 60.9 g (0.35 mol) of 2,4-diisocyanatotoluene (i),
(b) 64 g (0.334 mol) of trimellitic acid monoanhydride (ii),
(c) 3.90 g (0.032 mol) of benzoic acid (iv), and
(d) 300 g of distilled γ-butyrolactone.

The following relationships were thus established: r2=1, r3=9.58 and r4=0.

The reaction mixture was stirred at room temperature (23° C.) for 5 minutes and was then heated to 180° C.

The temperature increase required 1 hour. Once this temperature had been reached, the reaction was permitted to continue for 3 hours at 180° C. At the end of this time, the reaction mass was cooled to room temperature (23° C.). The collodion or poly(imideamide) solution thus obtained was a dark-colored liquid mass which had a weight of 397 g (containing 97.9 g of polymer).

Infrared analysis evidenced the presence in the collodion of imide C=O bands at ν=1710–1770 cm$^{-1}$ and the absence of the anhydride C=O band at ν=1850 cm$^{-1}$ and isocyanate at ν=2270 cm$^{-1}$.

The poly(imideamide) present in the solution essentially corresponded to the following formula:

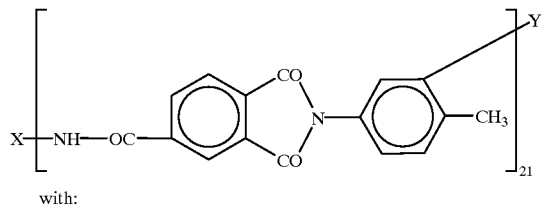

with:

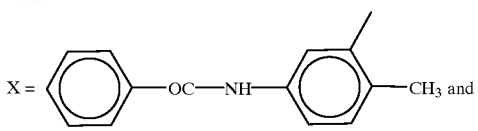

-continued

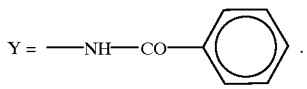

The collodion was cast onto a stainless steel panel, preliminarily degreased with trichloroethylene, with the aid of a pourer (thickness=100 μm). The solvent was then evaporated off in an oven according to the following procedure:

- 30 minutes at 190° C., then an increase in temperature to 200° C. over 50 minutes;
- 30 minutes at 200° C., then an increase in temperature to 250° C. over 50 minutes; and
- 1 hour at 250° C., then cooling at a rate of 5° C. per minute.

The varnish produced after this treatment had a thickness of 50 μm; it adhered strongly to the substrate and was lemon-yellow in color. Its luminance value was 11.3.

COMPARATIVE EXAMPLE 2

The following reactants were introduced successively at room temperature (23° C.) into the reactor of Example 1:
 (a) 72.5 g (0.29 mol) of 4,4'-diisocyanatodiphenylmethane,
 (b) 53 g (0.276 mol) of trimellitic acid monoanhydride,
 (c) 3.42 g (0.028 mol) of benzoic acid, and
 (d) 300 g of distilled γ-butyrolactone.

The following relationships were thus established: r2=1, r3=10.1 and r4=0.

The reaction mixture was stirred at room temperature (23° C.) for 5 minutes and was then heated to 180° C.

The temperature increase required 1 hour. Once this temperature had been attained, the reaction was permitted to continue at 180° C. After 2 hours at this temperature, the polymer precipitated in the reaction medium.

COMPARATIVE EXAMPLE 3

The following reactants were introduced successively at room temperature (23° C.) into the reactor of Example 1:
 (a) 72.5 g (0.29 mol) of 4,4'-diisocyanatodiphenylmethane,
 (b) 55.7 g (0.29 mol) of trimellitic acid monoanhydride, and
 (c) 300 g of γ-butyrolactone.

The reaction mixture was stirred at room temperature (23° C.) for 5 minutes and was then heated to 180° C. The temperature increase required 1 hour. Once this temperature had been attained, the reaction was permitted to continue at 180° C. for 2 hours. At the end of this time, 150 g of N-methylpyrrolidone were added and the mixture was cooled.

The collodion was cast onto a stainless steel panel, preliminarily degreased with trichloroethylene, with the aid of a pourer (250 μm thickness). The solvent was then evaporated off according to the procedure described in Example 1. The varnish produced after this treatment had a thickness of 50 μm; it was dark chestnut brown in color and had a luminance value of 3.9.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A storage-stable/clear solution of a linear aromatic poly(imideamide), adopted for forming a 10 to 100 mm thick film or varnish having a luminance ranging from 10 to 50 on a stainless steel substrate, comprising (a) a butyl alcohol-free, anhydrous γ-butyrolactone solvent, said γ-butyrolactone solvent (a) having a linear aromatic poly (imideamide) (b) dissolved therein, the concentration of said poly(imideamide) (b) therein ranging from 5% to 40% by weight relative to the total weight of the polymer (b) and solvent (a), said poly(imideamide) (b) comprising the copolymerizate of (i) 2,4-diisocyanatotoluene, 2,6-diisocyanatotoluene, or mixtures thereof, up to 30 mol % of said comonomer (i) comprising 4,4¢-diisocyanatodiphenylmethane, with (ii) a tricarboxylic acid monoanhydride, optionally, (iii) an aromatic dicarboxylic acid, and (iv) a chain limiting agent, wherein comonomer (iv) of said poly(imideamide) (b) comprises an aromatic monocarboxylic acid or an aromatic dicarboxylic acid monoanydride.

2. The storage-stable/clear solution as defined by claim 1, said concentration ranging from 10% to 30% by weight.

3. The storage-stable/clear solution as defined by claim 1, said poly(imideamide) (b) having the formula (I):

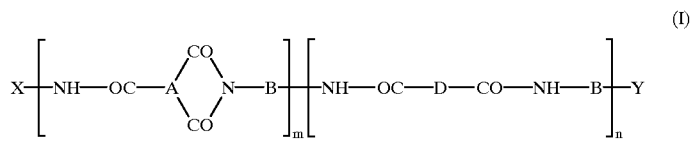

in which each of the symbols A, which are identical, is a trivalent aromatic radical having from 6 to 14 carbon atoms, or two such radicals linked together by a single valence bond or a group:

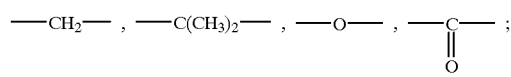

each of the symbols B, which may be identical or different, is a divalent radical selected from the radicals of the formulae:

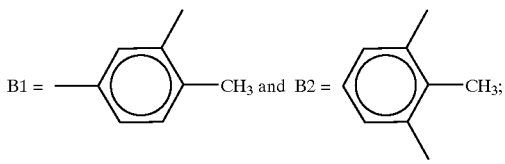

each of the symbols D, which are identical, is a divalent aromatic radical having from 6 to 14 carbon atoms; the symbols X and Y are either X1Y1 in which X1 is E—OC—NH—B— and Y1 is —NH—CO—E, wherein E is a monovalent aromatic radical having from 6 to 14 carbon atoms, or X2Y2 in which

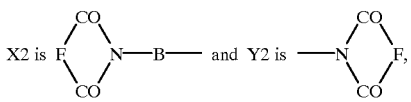

wherein F is a divalent aromatic radical having from 6 to 14 carbon atoms; the symbols m, which is a positive number, and n, which is a number equal to zero or a positive number, represent the average numbers of the various recurring structural units which are arranged statistically; with the proviso that the sum m+n ranges from 10 to 100, and the ratio r1=(n×100)/m ranges from 0 to 20.

4. The storage-stable/clear solution as defined by claim 1, the comonomer (ii) of said poly(imideamide) comprising trimellitic acid monoanhydride, 2,3,6-naphthalenetricarboxylic acid 2,3-monoanhydride, 1,8,4-napthalenetricarboxylic acid 1,8-monoanhydride, 1,2,5-naphthalenetricarboxylic acid 1,2-monoanhydride, 3,4,4'-diphenyltricarboxylic acid 3,4-monoanhydride, 3,4,3'-diphenyl sulfone tricarboxylic acid 3,4-monoanhydride, 3,4,4'-diphenyl ether tricarboxylic acid 3,4-monoanhydride, 3,4,4'-benzophenonetricarboxylic acid 3,4-monoanhydride, or 3,4,3'-diphenylisopropylidenetricarboxylic acid 3,4-monoanhydride.

5. The storage-stable/clear solution as defined by claim 4, the comonomer (iii) of said poly(imideamide) comprising terephthalic acid or isophthalic acid.

6. The storage-stable/clear solution as defined by claim 5, the comonomer (iv) of said poly(imideamide) comprising benzoic acid, 2-methylbenzoic acid, 3-methylbenzoic acid, 4-methylbenzoic acid, phthalic anhydride, 3-methylphthalic anhydride or 4-methylphthalic anhydride.

7. A process for the preparation of the storage-stable/clear solution as defined by claim 1, comprising heating and simultaneously reacting said comonomers (i), (ii), optionally (iii), and (iv), at a temperature ranging from 160° to 200° C., in said γ-butyrolactone solvent (a).

8. The process as defined by claim 7, wherein the ratio r2:

$$r2 = \frac{\text{number of moles of diisocyanate(s) (i)} \times 2}{\text{number of moles of anhydride (ii)} \times 2 \text{ plus number of moles of diacid (iii)} \times 2 \text{ plus number of moles of chain limiting agent (iv)}}$$

is equal to 1; the ratio r3:

$$r3 = \frac{\text{number of moles of chain limiting agent (iv)} \times 100}{\text{number of moles of anhydride (ii) plus number of moles of diacid (iii)}}$$

ranges from 2 to 20, and the ratio r4:

$$r4 = \frac{\text{number moles of diacid (iii)} \times 100}{\text{number of moles of anhydride (ii)}}$$

ranges from 0 to 20.

9. A film, varnish or adhesive prepared by evaporating said γ-butyrolactone solvent (a) from the storage-stable/clear solution as defined by claim 1.

10. The storage-stable/clear solution prepared by the process as defined by claim 7.

* * * * *